United States Patent [19]
Kobayashi et al.

[11] 3,897,359
[45] July 29, 1975

[54] EUROPIUM ACTIVATED ALKALINE EARTH METAL ALUMINO SILICATE PHOSPHOR AND METHOD FOR PREPARING THE SAME

[75] Inventors: Yoshichika Kobayashi, Ibaragi; Mutsuo Masuda, Kyoto; Masanori Takagawa, Osaka, all of Japan

[73] Assignee: Matsushita Electronics Corporation, Osaka, Japan

[22] Filed: June 2, 1970

[21] Appl. No.: 42,692

[30] Foreign Application Priority Data
June 11, 1969 Japan.................................. 44-47060

[52] U.S. Cl. .......................................... 252/301.4 F
[51] Int. Cl. ........................... C09k 1/54; C09k 1/68
[58] Field of Search................................ 252/301.4 F

[56] References Cited
UNITED STATES PATENTS

| | | | |
|---|---|---|---|
| 2,754,444 | 7/1956 | Zalm et al. ................... | 252/301.4 F |
| 3,093,594 | 6/1963 | Homer et al. ................. | 252/301.4 P |
| 3,359,211 | 12/1967 | Jaffe............................. | 252/301.4 F |
| 3,468,801 | 9/1969 | Wilson et al. ................ | 252/301.4 F |

*Primary Examiner*—Jack Cooper
*Attorney, Agent, or Firm*—Stevens, Davis, Miller & Mosher

[57] ABSTRACT

A phosphor consisting of a solid solution of a complex oxide of alkaline earth metals, aluminum and silicon, which contains oxides of the alkaline earth metals (Ca, Sr and Ba), aluminum and silicon as a host material, which is activated by divalent europium ($Eu^{2+}$), shows a bright luminescence spectrum in a wavelength region from near ultraviolet to bluish white, which depends upon the composition of the host material, through an excitation by ultraviolet rays or electron beams. The phosphor is utilized as a blue component for a fluorescent discharge lamp for copying, a flying spot tube, a storage tube or a Braun tube.

6 Claims, 4 Drawing Figures

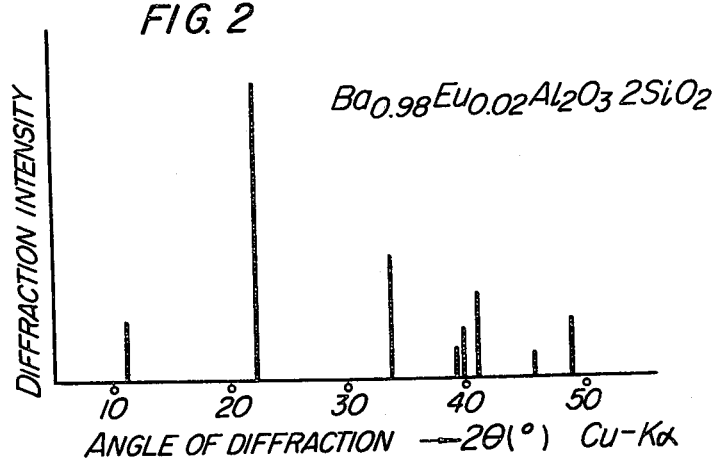

EUROPIUM ACTIVATED ALKALINE EARTH METAL ALUMINO SILICATE PHOSPHOR AND METHOD FOR PREPARING THE SAME

This invention relates to a novel phosphor consisting of a host material of alkaline earth metal, aluminum and silicates, and europium as an activator.

It has been found that a phosphor containing alkaline earth metal, aluminum and silicates as a host material, which is activated by divalent europium ($Eu^{2+}$), can emit a bright luminescence in a wavelength region from near ultraviolet to blue, which depends upon the composition of the host material.

The present invention is based on said finding, and a useful phosphor can be produced by preparing oxides of alkaline earth metals, aluminum, silicon and europium to specific proportions.

An object of the present invention is to obtain a chemically stable solid phosphor.

Other object of the present invention is to establish and propose a method for readily preparing such a phosphor.

The present phosphor is a solid solution of a complex oxide containing oxides of at least one of such alkaline earth metals as calcium, strontium and barium, aluminum and silicon, and europium as an activator, and its chemical composition is represented by the following formula:

$$(Ca_x Sr_y Ba_z Eu_p) O_{x+y+z+p} Al_2O_3 \cdot 2SiO_2$$

wherein $0.95 \leq x + y + z + p \leq 1.05$ $0.005 \leq p \leq 0.1$

As a result of crystal form observation by X-ray diffraction, the present phosphor takes a mono-phase, and is found to be a chemically very stable solid solution.

The present phosphor is prepared in the following manner:

A salt of alkaline earth metals (for example, $CaCO_3$, $SrCO_3$, $BaCO_3$, etc.), a salt of aluminum (for example, $Al(OH)_3$), a silicon compound (for example, $SiO_2$) and an europium compound (for example, $Eu_2O_3$) as raw materials are mixed in a specific proportion so that each component may satisfy said phosphor composition; then the resulting mixture is preliminarily fired at a specific temperature of 800° to 1,000°C in the presence of air or in a weakly reducible atmosphere to obtain a complex oxide; then the thus obtained complex oxide is fired at a firing temperature of 1,100° to 1,350°C for several hours in a weakly reducible atmosphere, for example, in a stream of an inert gas containing a small amount of hydrogen, whereby a bright phosphor is obtained.

Above all, in the phosphor composition represented by said composition formula, the peak wavelength of the emission spectrum is a blue above 400 nm in the case of $z + p \leq 0.9$, while the peak wavelength of a near ultraviolet luminescence is about 380 nm in the case that there is only barium as the alkaline earth metal. Any raw materials can be used for said respective components, so long as the raw materials can be converted to the corresponding oxides by thermal decomposition. That is, the raw materials are selected from carbonates, oxalates, nitrates, and hydroxides.

The present phosphor show an emission spectrum of a wavelength region from near ultraviolet to bluish-white through an excitation by ultraviolet rays of a wavelength region from 200 to 380 nm or electron beams, and these decay time is very short, for example, less than the time constant of one micro-second.

The present phosphor has a very excellent chemical stability at the normal temperature as well as in the course of excitation luminescence, and undergoes no deterioration almost at all in the normal service state. The present phosphor has a long life and can be used by applying it onto the fluorescent surface of the ordinary discharge lamp or the Braun tube.

Especially, the present phosphor is useful as a blue component of a discharge lamp for copying, or for a flying spot tube or a storage tube. Formation of a fluorescent surface applicable to these tube and lamp can be effected according to the conventional procedure.

FIG. 2 shows a characteristic crystal form observation of the present phosphor by X-ray diffraction.

The present invention will be explained, referring to examples:

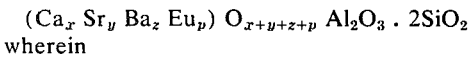

| Example 1 | |
|---|---|
| $BaCO_3$ | 6.446 grams |
| $Eu_2O_3$ | 0.117 grams |
| $Al(OH)_3$ | 5.119 grams |
| $SiO_2$ | 4.104 grams |

Figure 1A:
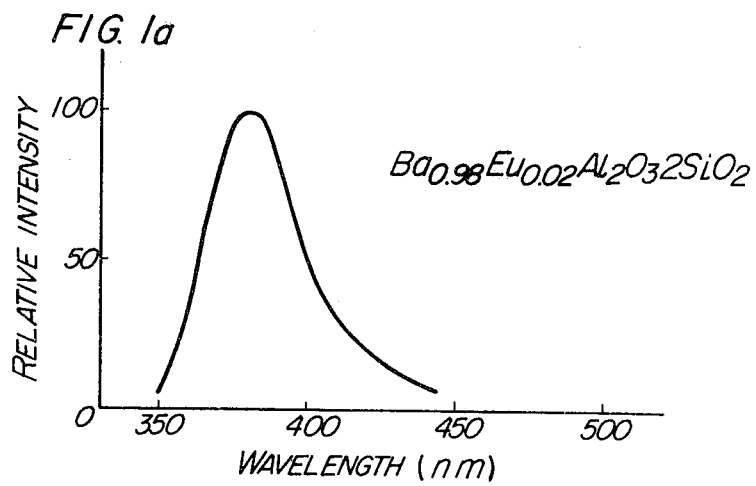
FIG. 1 shows luminescence spectra of the phosphors shown in examples, which are emitted through excitation by ultraviolet rays (253.7 nm).

Said four raw materials were sufficiently mixed in said mixing composition and preliminarily fired at 1,000°C in the presence of air for 1 hour. The resulting oxide mixture was pulverized and mixed, and fired at 1,200°C in a mixed gas stream of nitrogen and hydrogen (a volume ratio of $N_2$ to $H_2 = 9 : 1$) for 2 hours. The thus obtained phosphor had a luminescence characteristic as shown in FIG. 1a, where the excitation was effected by ultraviolet ray (253.7 nm). The host material structure of the thus obtained phosphor was a solid solution of crystal form shown in X-ray diffraction pattern of FIG. 2.

| Example 2 | |
|---|---|
| $SrCO_3$ | 4.822 grams |
| $Eu_2O_3$ | 0.117 grams |
| $Al(OH)_3$ | 5.199 grams |
| $SiO_2$ | 4.104 grams |

Figure 1B:
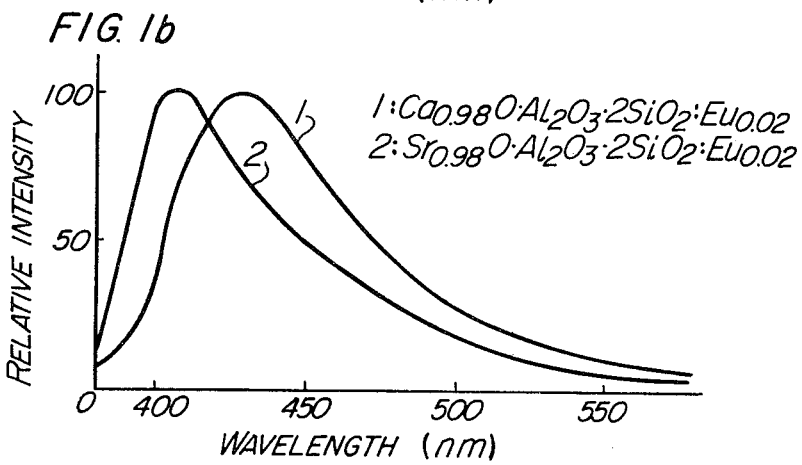

Said four raw materials were sufficiently mixed in said mixing composition and preliminarily fired at 1,000°C in the presence of air for 1 hour. The resulting oxide mixture was pulverized and mixed, and fired at 1,250°C in a mixed gas stream of nitrogen and hydrogen (a volume ratio of $N_2$ to $H_2 = 9 : 1$) for 4 hours. The thus obtained phosphor had a luminescence characteristic as shown in FIG. 1b as the curve 2.

| Example 3 | |
|---|---|
| $CaCO_3$ | 6.54 grams |
| $Eu_2O_3$ | 0.234 grams |
| $Al(OH)_3$ | 10.398 grams |
| $SiO_2$ | 8.210 grams |

These four raw materials were sufficiently mixed in said mixing composition and preliminarily fired at 900°C for 1 hour in the presence of air. Then, the resulting oxide mixture was fired at 1,200°C for 6 hours in a mixed gas stream of nitrogen and hydrogen (a volume ratio of $N_2$ to $H_2 = 95 : 5$). The thus obtained phosphor had a luminescence characteristic as shown in FIG. 1b as the curve 1, where the excitation was effected by ultraviolet ray having a wavelength of 253.7 nm.

| Example 4 | |
|---|---|
| $SrCO_3$ | 8.556 grams |
| $BaCO_3$ | 7.893 grams |
| $Eu_2O_3$ | 0.351 grams |
| $Al(NO_3)_3$ | 42.597 grams |
| $SiO_2$ | 12.53 grams |

Figure 1C:
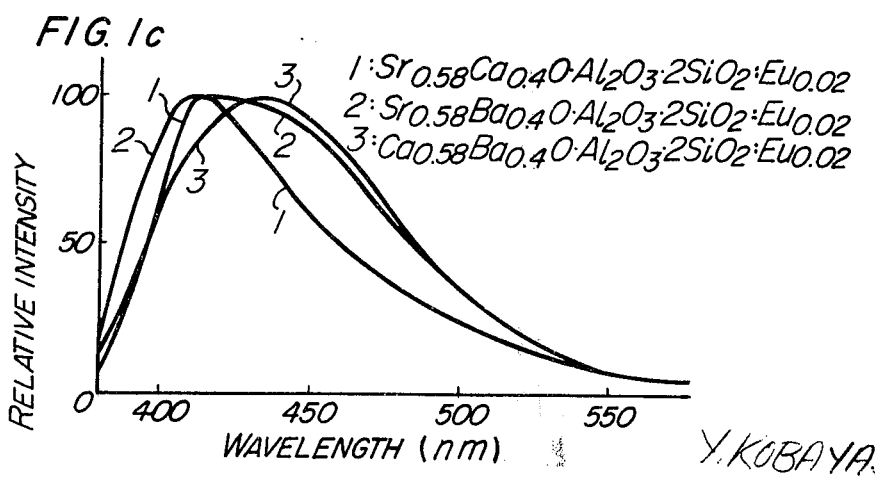

A raw material mixture of these five components in said composition was fired at 950°C for 1 hour in the presence of air, and the resulting oxide mixture was pulverized and mixed, and further fired at 1,300°C for four hours in a mixed gas stream of nitrogen and hydrogen (a volume ratio of nitrogen to hydrogen is 9 : 1). The thus obtained phosphor had a luminescence characteristic as shown in FIG. 1c as the curve 2, where the excitation was effected by ultraviolet rays (253.7 nm).

| Example 5 | |
|---|---|
| $CaCO_3$ | 1.742 grams |
| $BaCO_3$ | 2.368 grams |
| $Eu_2O_3$ | 0.107 grams |
| $Al(OH)_3$ | 4.679 grams |
| $SiO_2$ | 3.694 grams |

Said five raw materials were sufficiently mixed in said composition and preliminarily fired at 1,000°C for 1 hour in the presence of air. The resulting oxide mixture was pulverized and mixed, and fired at 1,250°C for 5 hours in a mixed gas stream of nitrogen and hydrogen (a volume ratio of nitrogen to hydrogen = 9 : 1). The thus obtained phosphor had a luminescence characteristic as shown in FIG. 1c as the curve 3, where the excitation was effected by ultraviolet ray (253.7 nm).

| Example 6 | |
|---|---|
| $CaCO_3$ | 2.402 grams |
| $SrCO_3$ | 5.138 grams |
| $Eu_2O_3$ | 0.212 grams |
| $Al_2(OH)_3$ | 9.358 grams |
| $SiO_2$ | 7.450 grams |

These five raw materials were sufficiently mixed in said composition and preliminarily fired at 1,000°C for 2 hours in the presence of air. The resulting mixture was pulverized and mixed, and fired at 1,350°C for 4 hours in a mixed gas stream of nitrogen and hydrogen (a volume ratio of nitrogen to hydrogen = 9 : 1). The thus obtained phosphor had a luminescence characteristic as shown in FIG. 1c as the curve 1.

| Example 7 | |
|---|---|
| $CaCO_3$ | 3.270 grams |
| $SrCO_3$ | 4.822 grams |
| $BaCO_3$ | 6.446 grams |
| $Eu_2O_3$ | 0.351 grams |
| $Al(OH)_3$ | 15.600 grams |
| $SiO_2$ | 12.300 grams |

These six raw materials were sufficiently mixed in said composition and preliminarily fired at 900°C for 2 hours in the presence of air. The resulting oxide mixture was pulverized and mixed, and fired at 1,300°C for 5 hours in a mixed gas stream of nitrogen and hydrogen (a volume ratio of $N_2$ to $H_2 = 9 : 1$). The thus obtained phosphor had a luminescence characteristic similar to those shown in FIG. 1c, where the excitation was effected by ultraviolet rays (253.7 nm). The phosphor emits a bright bluish white luminescence having a relatively broad luminescent zone.

What is claimed is:

1. A phosphor which comprises a solid solution of a complex oxide of alkaline earth metal, aluminum and silicon, which contains oxides of at least one of alkaline earth metals selected from calcium, strontium and barium, aluminum and silicon, and europium as an activator, whose chemical composition is represented by the following formula:

$$(Ca_x\ Sr_y\ Ba_z\ Eu_p)\ O_{x+y+z+p}\ Al_2O_3 \cdot 2SiO_2$$

where
$0.95 \leq x + y + z + p \leq 1.05$
$0.005 \leq p \leq 0.1$

2. A phosphor which comprises a solid solution of a complex oxide of alkaline earth metal, aluminum and silicon, which contains oxides of at least one of alkaline earth metals selected from calcium, strontium and barium, aluminum and silicon, and europium as an activator, whose chemical composition is represented by the following formula:

$$(Ca_x\ Sr_y\ Ba_z\ Eu_p)\ O_{x+y+z+p}\ Al_2O_3 \cdot 2SiO_2$$

where
$0.95 \leq x + y + z + p \leq 1.05$
$0.005 \leq p \leq 0.1$
$z + p \leq 0.9$ 3. A phosphor according to claim 1, where the alkaline earth metal is only barium, and $x = y = 0$, $0.95 \leq z + p \leq 1.05$ and $0.005 \leq p \leq 0.1$.

4. A method for preparing a phosphor consisting of a solid solution of a complex oxide containing oxides of at least one of alkaline earth metals selected from calcium, strontium and barium, aluminum and silicon, and europium as an activator, whose chemical composition is represented by:

$$(Ca_x\ Sr_y\ Ba_z\ Eu_p)\ O_{x+y+z+p}\ Al_2O_3 \cdot 2SiO_2$$

where
$0.95 \leq x + y + z + p \leq 1.05$
$0.005 \leq p \leq 0.1$ which comprises the first step of preliminarily firing a mixture of at least one member selected from carbonates, oxalates, nitrates and hydroxides containing said respective oxide components to thermally decompose said salt to an oxide mixture, and the second step of firing said oxide mixture at a temperature ranging from 1,100° to 1,350°C to form a solid solution of complex oxide.

5. A method according to claim 4, where the first step is carried out at a firing temperature of 800° to 1,000°C.

6. A method according to claim 4, wherein the second step is carried out in a weakly reducible atmosphere.

* * * * *